United States Patent
Kusafuka et al.

(10) Patent No.: US 6,546,348 B2
(45) Date of Patent: Apr. 8, 2003

(54) RANGE SWITCHOVER APPARATUS FOR AUTOMATIC TRANSMISSION (75) Inventors: Muneo Kusafuka, Anjo (JP); Yoshitaka Murase, Anjo (JP); Hirotoshi Eishima, Anjo (JP); Kazuo Takemoto, Anjo (JP); Naoki Ohkoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/740,055

(22) Filed: Dec. 20, 2000

(65) Prior Publication Data
US 2001/0005816 A1 Jun. 28, 2001

(30) Foreign Application Priority Data
Dec. 27, 1999 (JP) .............................. 11-371508

(51) Int. Cl.[7] .......................... G01C 17/38; G01P 21/00; G06F 19/00
(52) U.S. Cl. ....................................................... 702/96
(58) Field of Search ............................. 702/96; 74/335, 74/866, 473.12, 473.18; 324/207.2; 477/34; 475/7; 364/424.1; 479/116, 97, 98

(56) References Cited

U.S. PATENT DOCUMENTS

| 4,523,281 A | * | 6/1985 | Noda et al. ............... 364/424.1 |
| 4,693,143 A | * | 9/1987 | Harada et al. .................. 74/866 |
| 4,724,725 A | * | 2/1988 | Harada et al. .................. 74/866 |
| 5,094,115 A | * | 3/1992 | Michihira et al. ............... 475/7 |
| 5,370,015 A | * | 12/1994 | Moscatelli ................ 324/207.2 |
| 5,689,994 A | * | 11/1997 | Nagai et al. .................... 310/80 |
| 6,141,494 A | * | 10/2000 | Nishino et al. .............. 388/811 |
| 6,157,884 A | * | 12/2000 | Narita et al. ................... 477/34 |
| 6,230,576 B1 | * | 5/2001 | Yamada et al. ................ 74/335 |

FOREIGN PATENT DOCUMENTS

JP  7-190180  7/1995

OTHER PUBLICATIONS

U.S. patent application No. 09/750,488 filed Dec. 20, 2000.

* cited by examiner

Primary Examiner—John Barlow
Assistant Examiner—Aditya Bhat
(74) Attorney, Agent, or Firm—Oliff & Berridge, PLC (57) ABSTRACT A range switchover apparatus includes a range switchover means operating device capable of switching over a switchover means, which switches over a shift range, among respective shift positions, a drive motor for driving the range switchover means operating device, a measuring device for measuring a time, during which the drive motor causes the range switchover means operating device to switch over between predetermined shift positions, a rotation control device for controlling the rotational speed of the drive motor, a correcting device for correcting the rotational speed by the rotation control device so that when a time measured by the measuring device differs from a target time in a predetermined range, the measured time becomes the target time, and a storage device for storing the rotational speed corrected by the correcting device. The range switchover apparatus prevents a change in rotational speed due to long term change from being generated in a motor for driving a switchover means in an automatic transmission.

7 Claims, 9 Drawing Sheets

MAP 1 DUTY RATIO (%)

| OIL TEMPERATURE (°C) \ VOLTAGE (V) | 8 | 10 | 12 | 14 | 16 |
|---|---|---|---|---|---|
| -40 | 90 | 90 | 90 | 90 | 80 |
| -20 | 90 | 90 | 90 | 90 | 80 |
| 0 | 90 | 90 | 90 | 90 | 60 |
| 20 | 90 | 90 | 80 | 70 | 40 |
| 80 | 90 | 90 | 80 | 70 | 40 |
| 120 | | 90 | 80 | 60 | 40 |

FIG. 6

MAP 2  NEUTRAL (N)-DRIVE (D) TARGET TIME (ms)

| VOLTAGE (V)<br>OIL TEMPERATURE (°C) | 8V | 10V | 12V | 14V | 16V |
|---|---|---|---|---|---|
| -40 | 300 |  |  |  |  |
| -20 | 300 | 200 | 150 | 150 | 150 |
| 0 | 200 | 200 | 150 | 150 | 150 |
| 20 | 100 | 200 | 150 | 100 | 100 |
| 40 | 100 | 100 | 100 | 100 | 100 |
| 80 | 100 | 100 | 100 | 100 | 100 |
| 120 | 100 | 100 | 100 | 100 | 100 |

Fig. 7

Fig. 8

RANGE SWITCHOVER APPARATUS FOR AUTOMATIC TRANSMISSION

BACKGROUND OF THE INVENTION

1. Field of Invention

The invention relates to a range switchover apparatus for use in switchover of a running range of an automatic transmission.

2. Description of Related Art

Conventionally, a range switchover apparatus for switchover of a running range of an automatic transmission comprises a manual valve in the automatic transmission, and a shift lever connected to the manual valve by a shift cable and provided in a vehicle interior. The range switchover apparatus is constructed such that a driver operates the shift lever to thereby switch over the manual valve via the shift cable. However, a requirement has been created to permit increased freedom for the location where the shift lever is installed, as a result of recent increases in the freedom in vehicle interior design for automobiles and because of an increase in the types of vehicle derived from the same platform.

A range switchover apparatus, which meets with such demand, is disclosed in Japanese Patent Laid-Open No. 190180/1995. With such a range switchover apparatus, a motor is used to actuate a manual valve to perform switchover of the running ranges.

However, conventional range switchover apparatuses have never taken any measure to meet secular change due to a long term use of the motor. Therefore, there is the possibility that a change in rotational speed of the motor extends or shortens the time required for the switchover of ranges, thereby giving an uncomfortable feeling to a driver.

SUMMARY OF THE INVENTION

The invention has its object to provide a range switchover apparatus capable of surely performing a switchover of a switchover means while preventing secular change from causing a change in the rotational speed of a motor for driving a switchover means of an automatic transmission.

The above-mentioned problem is solved by a range switchover apparatus for automatic transmissions, comprising a range switchover means operating unit capable of switching over a switchover means, which switches over a shift range, among respective shift positions (P, R, N, D, L), a drive motor for driving the range switchover means operating unit, a measuring unit for measuring a time, during which the drive motor causes the range switchover means operating unit to switch over between predetermined shift positions (P, R, N, D, L), a rotation control unit for controlling the rotational speed of the drive motor, a correcting unit for correcting the rotational speed by the rotation control unit so that when a time measured by the measuring unit differs from a target time in a predetermined range, the measured time becomes the target time, and a storage unit for storing the rotational speed corrected by the correcting unit.

The invention has a feature in the range switchover apparatus for automatic transmissions, such that the target time is one set in accordance with an environmental condition, the rotation control unit controls the rotational speed of the drive motor on the basis of a duty ratio of the drive motor, and the correcting unit compares the measured time and the target time with each other to correct the duty ratio so as to make the duty ratio large when the measured time exceeds the target time and to correct the duty ratio so as to make the duty ratio small when the measured time is short of the target time.

BRIEF DESCRIPTION OF THE DRAWINGS

The invention will be described in conjunction with the following drawings in which like features are designated with like reference characters, and wherein:

FIG. 6 is a table indicating a target time of switchover between a neutral range and a drive range in a battery voltage and a temperature of the working oil in the automatic transmission, respectively;

DETAILED DESCRIPTION OF PREFERRED EMBODIMENTS

Figure 1:
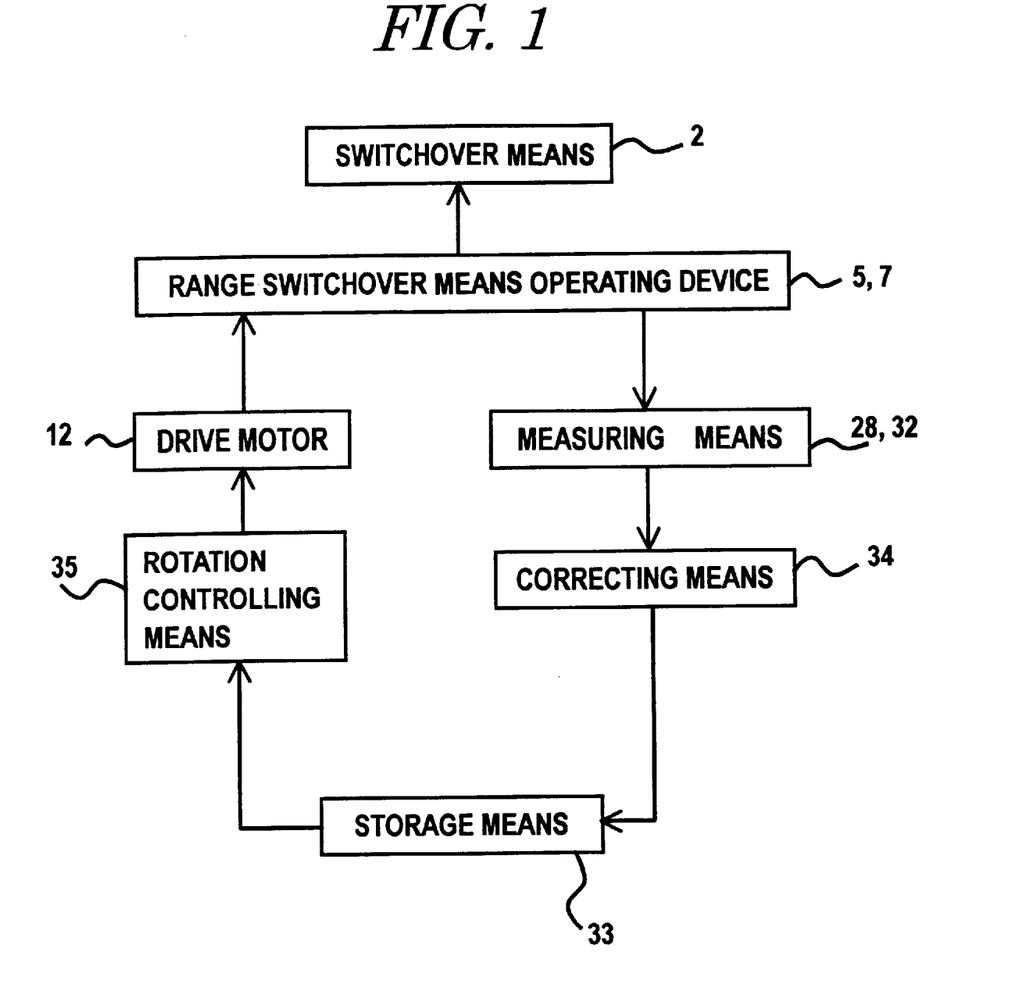
FIG. 1 is a block diagram showing a range switchover apparatus according to the invention.

When the drive motor 12 is started, the range switchover means operating unit 5, 7, the range switchover means operating unit in this exemplary embodiment is a detent lever 5 and a range control shaft 7, is actuated toward predetermined shift positions (P, R, N, D, L) to switch over the switchover means 2, the switchover means in this exemplary embodiment is a switchover valve 2. The measuring unit 28, 32 measures a time, during which the range switchover means operating unit 5, 7 switches over between predetermined shift positions (P, R, N, D, L). The drive motor 12 is controlled to rotate by the rotation control unit 35. Initially, the rotation control unit 35 rotates and controls the drive motor 12 on the basis of rotational speeds stored in the storage unit 33.

When the drive motor 12 changes in rotational speed due to a long term change in the drive motor 12, the range switchover means operating unit 5, 7 also changes in operational speed and time required for changeover between the predetermined shift positions (P, R, N, D, L). When a time measured by the measuring unit 28, 32 differs from a target time in a predetermined range, the correcting unit 34 corrects the rotational speed so that the time measured by the measuring unit 28, 32 approaches the target time. The storage unit 33 stores a new rotational speed, and in the next range switchover, the rotation control unit 35 controls rotation of the drive motor 12 at the new stored rotational speed.

However, in the case where a time measured by the measuring unit 28, 32 does not make a target time in a predetermined range even when the rotation control unit 35 rotates the drive motor 12 at the new rotational speed, the correcting unit 34 again corrects the rotational speed, the corrected rotational speed is stored in the storage unit 33 and the rotation control unit 35 rotates the drive motor 12 at the corrected rotational speed. The range switchover apparatus 1 repeats the procedure to constantly perform control so that the range switchover time becomes a target time in a predetermined range.

In addition, the target time is a time set in view of circumstances, such as a battery voltage of the drive motor 12, temperature of the working oil of the automatic transmission, and so on.

Also, the rotational speed of the drive motor 12 is corrected by changing, for example, a duty ratio. Therefore, the storage unit 33 stores the duty ratio. More specifically, the correcting unit 34 compares a measured time and a target time with each other to correct the duty ratio to make the duty ratio small when the measured time exceeds the target time and to make the duty ratio large when the measured time is short of the target time. The corrected duty ratio is stored in the storage unit 33.

In addition, the reference numbers used are for convenience and correspondence with the drawings, and are not intended to limit the structure of the invention.

A range switchover apparatus 1 according to embodiments of the invention will be explained with reference to the drawings.

Figure 2:
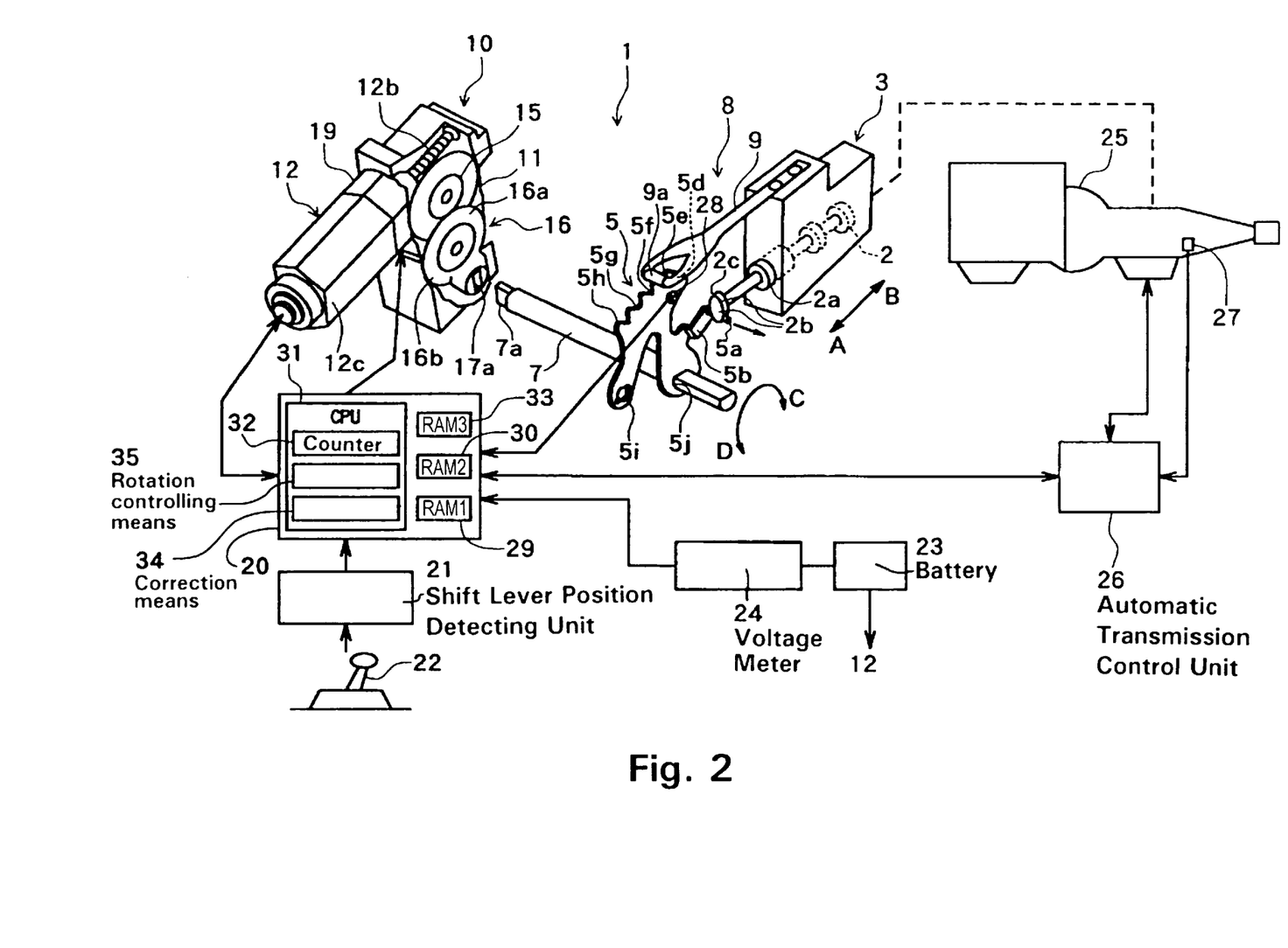
FIG. 2 is a diagrammatic view showing the complete range switchover apparatus according to an embodiment of the invention.

FIG. 2 is a diagrammatic view of a range switchover apparatus 1 of an automatic transmission. The range switchover apparatus 1 is adapted to actuate a manual valve 2, which serves as a switchover valve or means constituting a part of an automatic transmission, such as multistage type automatic transmissions and continuously variable transmissions (CVT). The manual valve 2 is contained in a valve body 3, which constitutes a part of an outward appearance of an automatic transmission. The manual valve 2 is provided within the valve body 3 and is movable in directions indicated by arrows A and B, corresponding to the axial direction of a spool 2a of the valve. The automatic transmission can be sequentially switched over to P, R, N, D and L ranges from the arrow B side to the arrow A side, in the figure, by moving the manual valve 2 in the directions of the arrows A and B. An engagement groove 2c between two circular disks 2b, 2b is formed on a tip end of the manual valve 2 on the arrow A side. A detent lever (range switchover means operating unit) 5 engages the engagement groove 2c via a pin 5a provided on an arm portion 5b of the detent lever 5.

Figure 3:
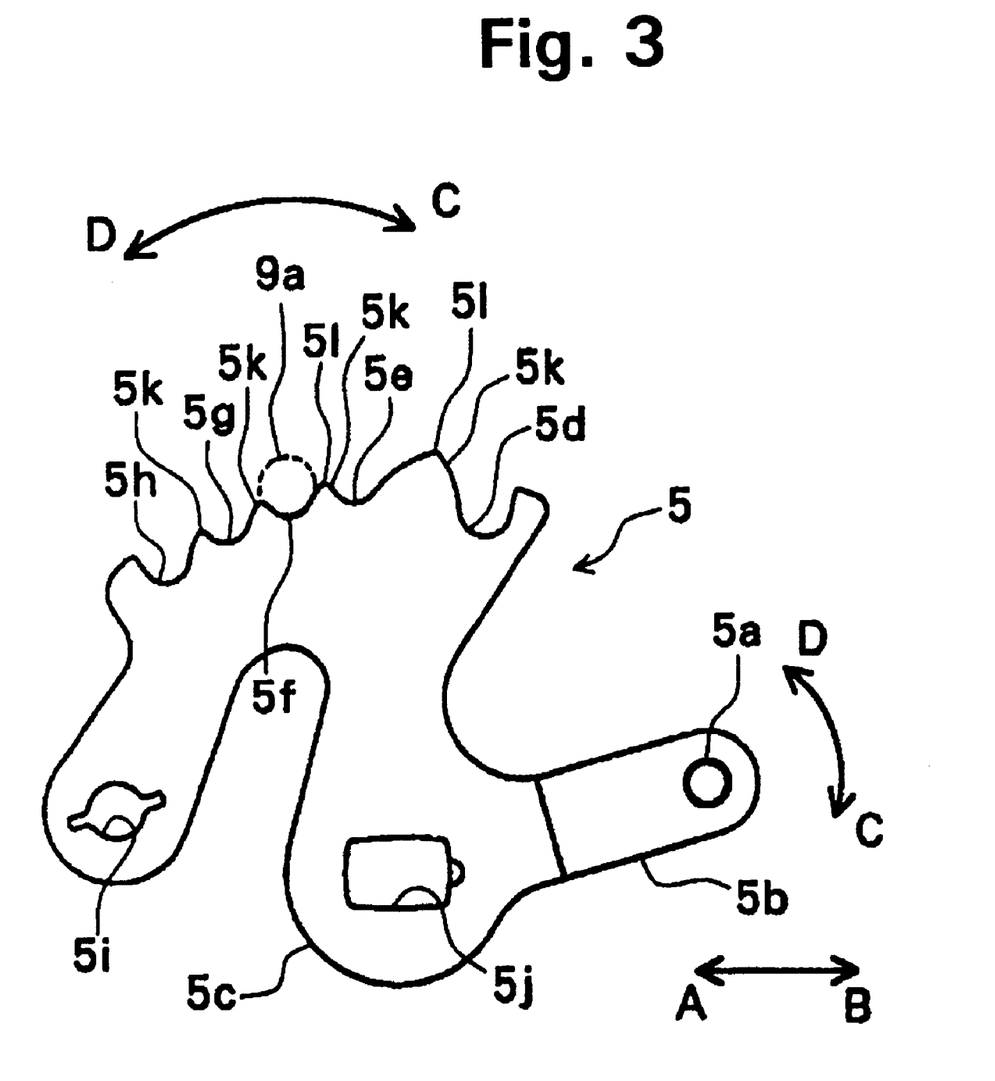
FIG. 3 is an enlarged view showing a detent lever.

The detent lever 5 has a sheet-shaped body 5c as shown in FIG. 3. Five range engagement grooves 5d, 5e, 5f, 5g, 5h are formed at predetermined spacings on an upper portion of the body 5c as viewed in the figure. The respective range engagement grooves 5d, 5e, 5f, 5g, 5h are arranged in order from a right side in the figure to correspond to the ranges "P", "R", "N", "D" and "L" of the automatic transmission. Also, the arm portion 5b, provided with the pin 5a, projects rightward of the body 5c as viewed in the figure. A parking rod engaging hole 5i for driving of a parking mechanism in the P range (not shown) is formed on and extended through a leftward portion of the body 5c as viewed in the figure. Also, a rectangular-shaped engagement hole 5j, through which a range control shaft 7, described later, is inserted, is formed on and extended through a substantially central portion of the body.

Provided on an upper portion of the five range engagement grooves 5d, 5e, 5f, 5g, 5h of the body 5c is a detent spring 9 composed of a sheet spring that is fixed at one end thereof to the valve body 3, a casing of the automatic transmission or the like. A roller 9a is rotatably supported on a tip end of the detent spring 9 and is biased downward, in FIGS. 2 and 3, by the elasticity of the detent spring 9 to fit into and engage with one of five range engagement grooves 5d, 5e, 5f, 5g, 5h. Also, the rod-shaped range control shaft 7 engages with the engagement hole 5j of the body 5c to be made integral with the detent lever 5. The detent lever 5, the detent spring 9 and so on constitute a detent mechanism 8.

The range control shaft 7 is formed at its left tip end (as viewed in FIG. 2) with an engaging portion 7a having a rectangular-shaped cross section. A valve drive device 10 is connected to the engaging portion 7a. The valve drive device 10 is mounted on a cover of the automatic transmission or the like. The valve drive device 10 has a box-shaped casing 11. The casing 11 mounts thereon the DC drive motor 12. The drive motor 12 is provided with a clutch 19. A worm gear 12b is mounted on an output shaft of the drive motor 12. The worm gear 12b meshes with a worm wheel (not shown), which is rotatably supported on the casing 11. A gear 15 is provided on the worm wheel to rotate together with the worm wheel.

A large gear 16a of a two-stage gear 16 is rotatably supported on the casing 11 and can mesh with the gear 15. The two-stage gear 16 comprises a small gear 16b having a half of a pitch circle radius of the large gear 16a and is formed coaxially and integral therewith.

The small gear 16b meshes with an output gear (not shown), which has a pitch circle radius four times that of the small gear 16b. The output gear is rotatably supported on the casing 11. Further, the output gear is formed centrally thereof with a rectangular-shaped engagement hole 17a. The above-mentioned engaging portion 7a of the range control shaft 7 fits into and engages with the engagement hole 17a.

Connected to the drive motor 12 and the clutch 19 is a range control unit 20 for controlling the range switchover apparatus 1. The range control unit 20 is contained in the casing 11 and connected to a shift lever position detecting unit 21. The shift lever position detecting unit 21 is adapted to detect the position of a shift lever 22. Connected to the range control unit 20 is a voltage meter 24 for measuring the voltage of a battery 23 connected to the motor 12.

Also, connected to the range control unit 20 is an automatic transmission control unit 26 for controlling an automatic transmission 25. Connected to the automatic transmission control unit 26 is an oil temperature sensor 27, which is provided in the automatic transmission 25 to measure a temperature of a working oil in the automatic transmission 25. Also, connected to the range control unit 20 is a position sensor 28, which is provided on a stationary member (not shown) to detect the positions of the range engagement grooves 5d, 5e, 5f, 5g, 5h of detent lever 5. The position sensor 28 detects a body 36, provided on inlets, described later, of the respective range engagement grooves 5d, 5e, 5f, 5g, 5h to detect the range engagement grooves 5d, 5e, 5f, 5g, 5h.

Figure 5:
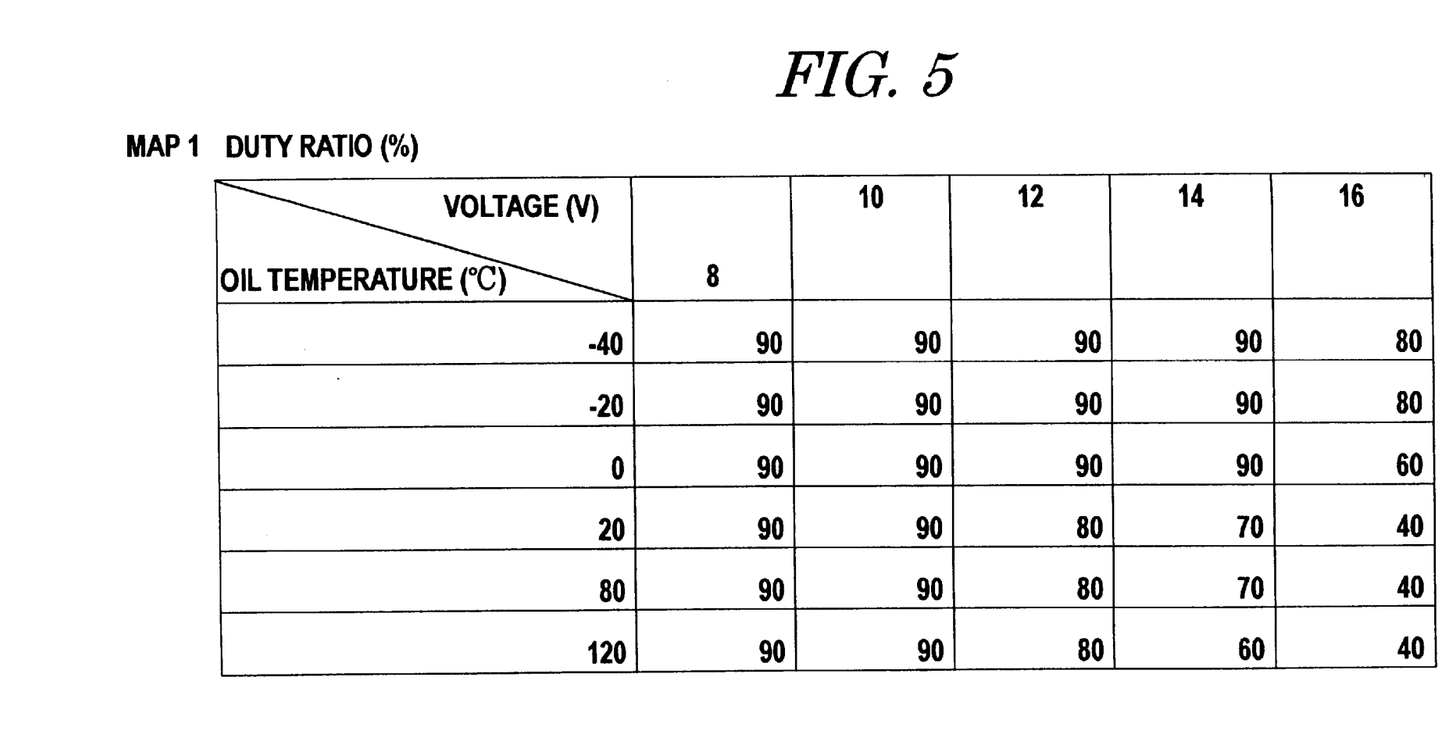
FIG. 5 is a table indicating a duty ratio of a motor on the basis of a battery voltage and a temperature of a working oil in an automatic transmission.

The range control unit 20 comprises, as shown in FIG. 2, a RAM1 29 for storing the battery voltage measured by the voltage meter 24, a RAM2 30 for storing the oil temperature in the automatic transmission 25, measured by the oil temperature sensor 27, a counter 32 for counting a time required for switching over the range engagement grooves making use of the position sensor 28 detecting the range engagement grooves 5d, 5e, 5f, 5g, 5h, a RAM3 33 for storing a table of duty ratios (referred below to as "MAP1") conformed to the circumstance shown in FIG. 5, a table of target times (referred below to as "MAP2") conformed to the circumstance required for switchover between a neutral position (N) and a drive position (D), and a selected duty ratio of the motor 12, a correcting unit 34 for again selecting the duty ratio so that a measurement time approaches a target time when a measurement time by the counter 32 differs from a target time in a predetermined range, a rotation control unit 35 for controlling the rotational speed of the motor 12 on the basis of the duty ratio as shown in FIG. 6 and controlling the actuation of the clutch 19, and so on. The counter 32, correcting unit 34 and the rotation control unit 35 are provided in a CPU 31.

Figure 4:
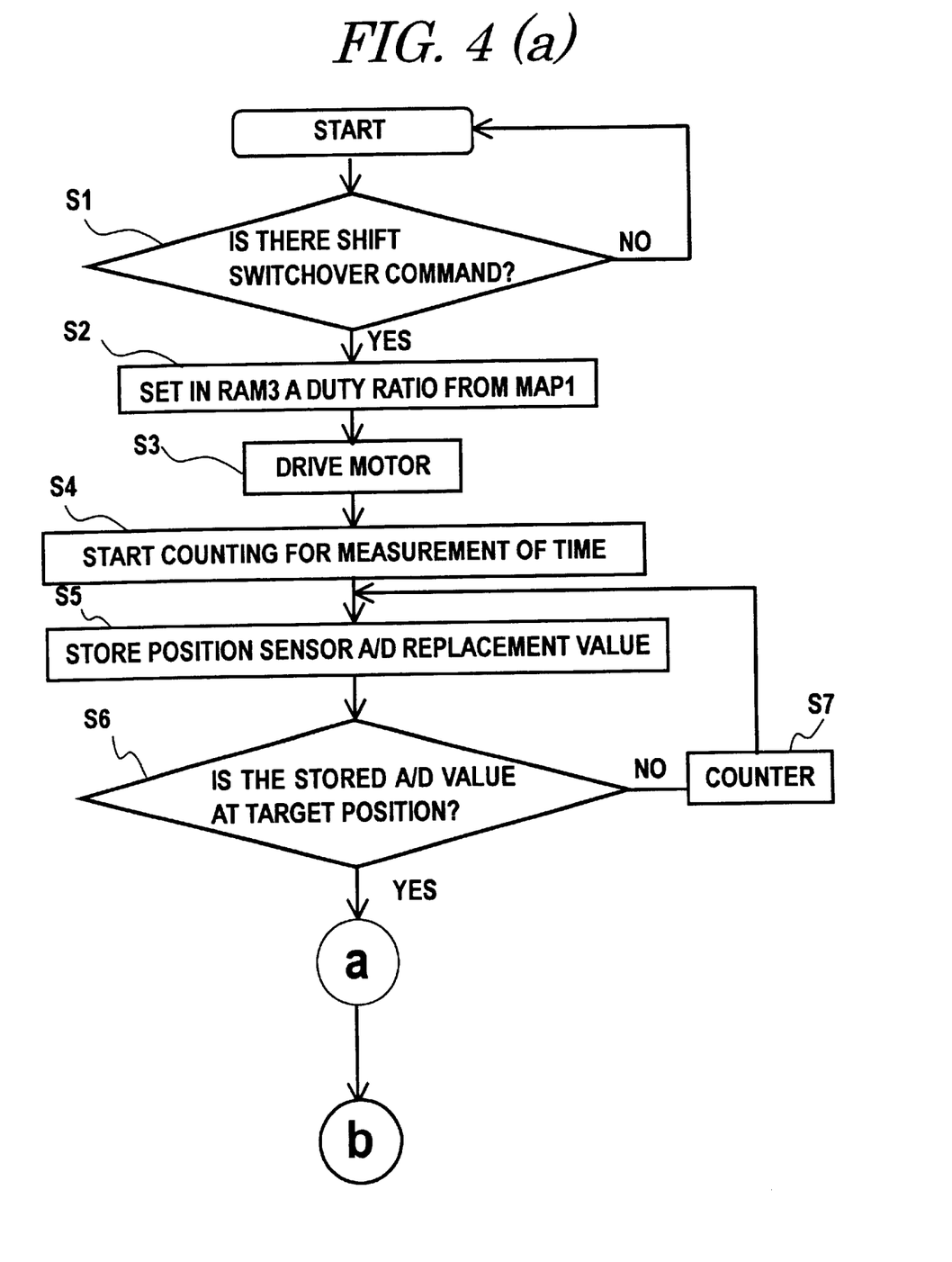
FIGS. 4(a) and 4(b) are an operation flowchart of the range switchover apparatus.

An explanation of the operation of the range switchover apparatus will be given on the basis of the flowchart of FIG. 4.

At the start of or during the running of a vehicle, when the shift lever 22 is switched over, the shift lever position detecting unit 21 detects a switchover position of the shift lever 22 to inform the rotation control unit 35 of the same in step S1. At this time, the battery voltage, measured by the voltage meter 24, is stored in the RAM1 29, and the temperature of the working oil in the automatic transmission 25, measured by the oil temperature sensor 27, is stored in the RAM2 30.

The rotation control unit 35 causes the RAM2 30 to select a duty ratio from the MAP1 on the basis of the battery voltage and the oil temperature and stores the selected duty ratio in step S2. In addition, the duty ratio is a ratio of a movable time to a total time in a given time period. In step S3, rotation control unit 35 starts the motor 12 so as to turn the detent lever 5 to a position where the range engagement grooves 5d, 5e, 5f, 5g, 5h corresponding to a range conformed to a switchover position of the shift lever can engage with the roller 9a.

The motor 12 rotates forward or rearward at a rotational speed that conforms to the duty ratio. Then the range control shaft 7 rotates a predetermined angle in a direction of an arrow C or D, FIG. 1, through rotation of the worm gear 12b, worm wheel (not shown), gear 15, two-stage gear 16, and output gear (not shown). The detent lever 5, pin 5a, and the arm portion 5b also rotate in the direction of the arrow C or D. When the pin 5a has rotated a predetermined angle, the spool 2a of the manual valve 2, engaged by the pin 5a via the engagement groove 2c, is moved in a direction of the arrow A or B. The range of the manual valve 2 is sequentially switched over to the P, R, N, D and L ranges from the side of the arrow B.

In the course of the switchover, the position sensor 28 sequentially detects the range engagement grooves 5d, 5e, 5f, 5g, 5h, which engage with the roller 9a, step S4. Simultaneously, the counter 32 counts a time required for adjacent range engagement grooves to be switched over, steps S5 to S7. The counter 32 is called in the range control unit 20 at a constant interval, so that the count number is replaced by time. In the embodiment, for example, in the case of switchover between the neutral position (N) and the drive position (D), the rotation control unit 35 causes the RAM3 33 to read a target time for the range switchover from the MAP2 on the basis of the information about the battery voltage, measured by the voltage meter 24 and the information about the oil temperature, measured by the oil temperature sensor 27. Further, the rotation control unit 35 judges whether a time (measurement time) required for switchover from the neutral position N to the drive position D is in the range of target time, step S8. When the time is in the range of target time, the duty ratio of the drive motor 12 remains as it is, it is not altered.

When the measurement time is short of the range of target time, step S9, however, the detent lever 5 rotates at a greater rotational speed than a normal rotational speed, which necessitates reduction in the rotational speed of the motor 12 at the time of the next switchover. Hereupon, the correcting unit 34 corrects the duty ratio stored in the RAM3 33 to a lower value by 5% step S10, and corrects all the values of the MAP1 to lower values by 5%, S13. At the next time, the rotation control unit 35 controls the rotation of the drive motor 12 on the basis of the duty ratio, which is decreased 5%.

Conversely, when the measurement time is longer than the range of target time, step S11, the detent lever 5 rotates at a smaller rotational speed than the normal rotational speed, which necessitates an increase in the rotational speed of the motor 12 at the time of the next switchover. Hereupon, the correcting unit 34 corrects the duty ratio stored in the RAM3 33 to a higher value. When the duty ratio is 100 or more, it cannot be increased. Therefore, only when a duty ratio stored in the RAM3 33 is less than 100, the correcting unit 34 corrects the duty ratio higher by 5% to make all the values of the MAP1 higher by 5% in steps S12 and S13. From the next time on, the rotation control unit 35 controls the rotation of the drive motor 12 on the basis of the duty ratio, which is increased 5%. On the other hand, when a duty ratio stored in the RAM3 33 is 100 or more, and a difference between a maximum target time in the range of target time and a measurement time amounts to at most 20% of the target time, the duty ratio is not increased but remains as it is in step S14. In the case where the difference is over 20%, the drive motor 12 is put in an abnormal state, and the range control unit 20 transmits an abnormality signal, step S15.

In this manner, the range switchover apparatus, according to the embodiment, stores the duty ratio, by which a switchover time comes within a target time when a range switchover time differs from the target time because of the long term change. In addition, the range switchover apparatus, according to the embodiment, corrects the duty ratio again when the latter does not come within the range of target time even at the time of the next switchover, and repeats such operations. Also, the drive motor 12 tends to become higher in rotational speed at some period and then lower when its rotational speed changes due to a long term change.

Figure 7:
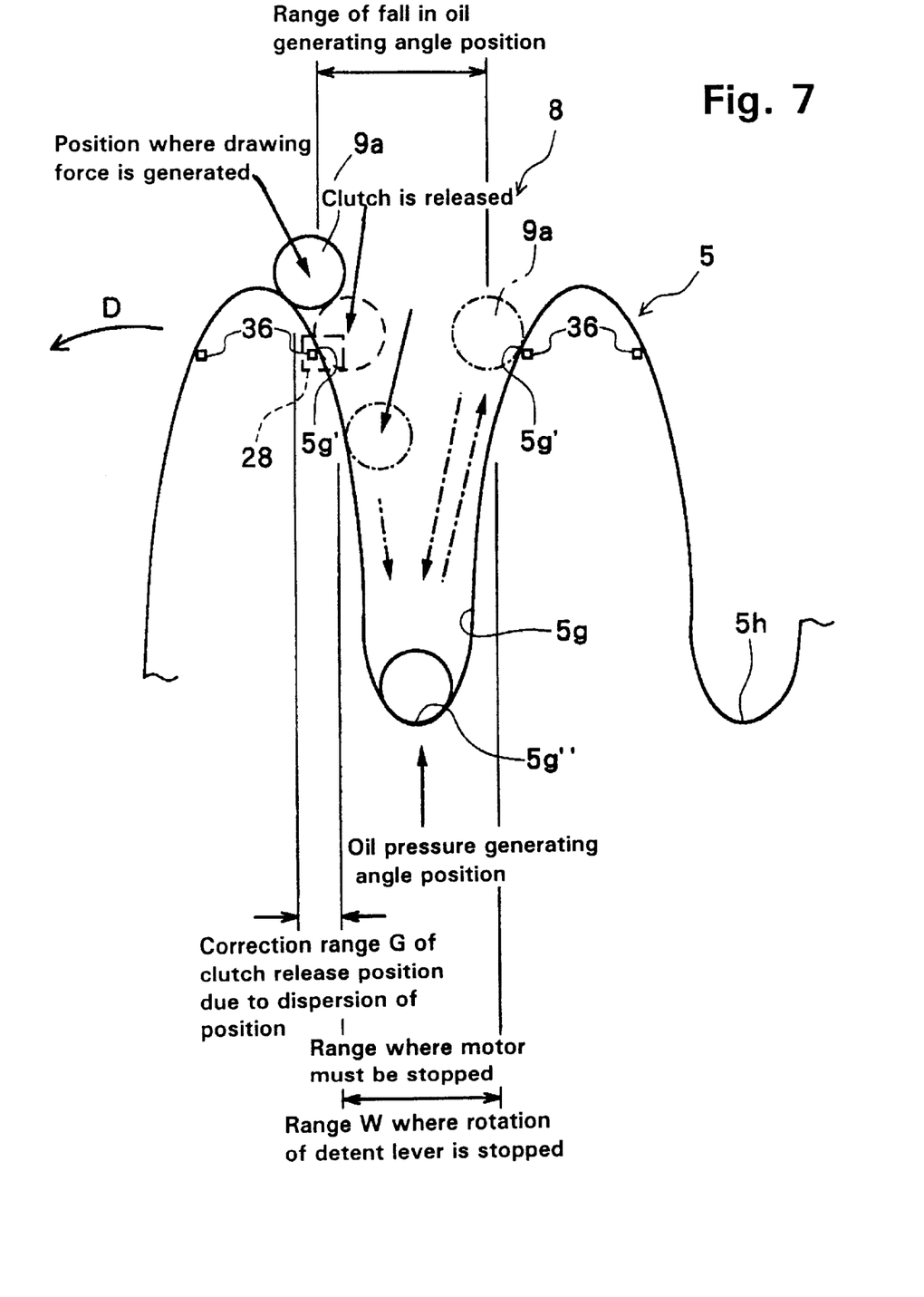
FIG. 7 is a view illustrating the operation of a detent mechanism in the range switchover apparatus.

In the case where the detent lever 5 rotates in the direction of arrow D in FIG. 7 in the above-mentioned operation, for example, when an inlet 5g' (see FIG. 7) of the range engagement groove 5g, corresponding to a drive range position, is facing the roller 9a, the position sensor 28 detects a body 36 provided on the inlet 5g' to identify the inlet 5g'. The rotation control unit 35 releases the clutch 19 to prevent torque of the drive motor 12 from being transmitted to the detent lever 5, thereby stopping rotation of the detent lever 5. In FIG. 7, when having passed a position where a drawing force is generated for the roller 9a, the detent lever 5 provides that the detent engagement groove receives the roller 9a.

When the inlet 5g' of the range engagement groove 5g faces the roller 9a, the reason why the clutch 19 is released so as to prevent torque of the drive motor 12 from being transmitted to the detent lever 5, is that after the clutch 19 is released, the detent lever 5 may rotate due to inertia of respective parts and stop its rotation before the roller 9a falls down into the valley 5g" of the range engagement groove or after the roller passes the valley 5g" of the range engagement groove 5g. In such case, the range switchover position of the manual valve 2 may become incorrect and so the switchover operation of the automatic transmission 25 may not be effected smoothly.

With the range switchover apparatus 1, according to the embodiment, the position sensor 28 detects the inlet 5g' of the range engagement groove 5g relative to the roller 9a, as shown in FIG. 7, before the roller 9a falls down into the valley 5g" of the range engagement groove, the clutch 19 is released taking account of inertia of respective parts so that the valley 5g" of the range engagement groove 5g receives and bears the roller 9a.

In addition, because it is difficult for the valley 5g" to surely bear the roller 9a, the range engagement groove 5g bears the roller 9a in some region (a detent lever rotation stopping region W) around the valley 5g". The region W is set in a range of error in the range switchover of the manual valve 2, and is one in which oil pressure is generated due to the range switchover of the manual valve 2.

However, even when the timing for stopping the motor 12 is set taking into account inertia of respective parts, the vehicle driver is, in some cases, given an uncomfortable feeling because the rotational speed of the motor 12 has changed in long term use to vary the time required for range switchover. Therefore, the range switchover apparatus 1 according to the invention is designed as described above to correct for and store the duty ratio of the motor 12 so that a range switchover time comes within a target time the next time.

Figure 8:
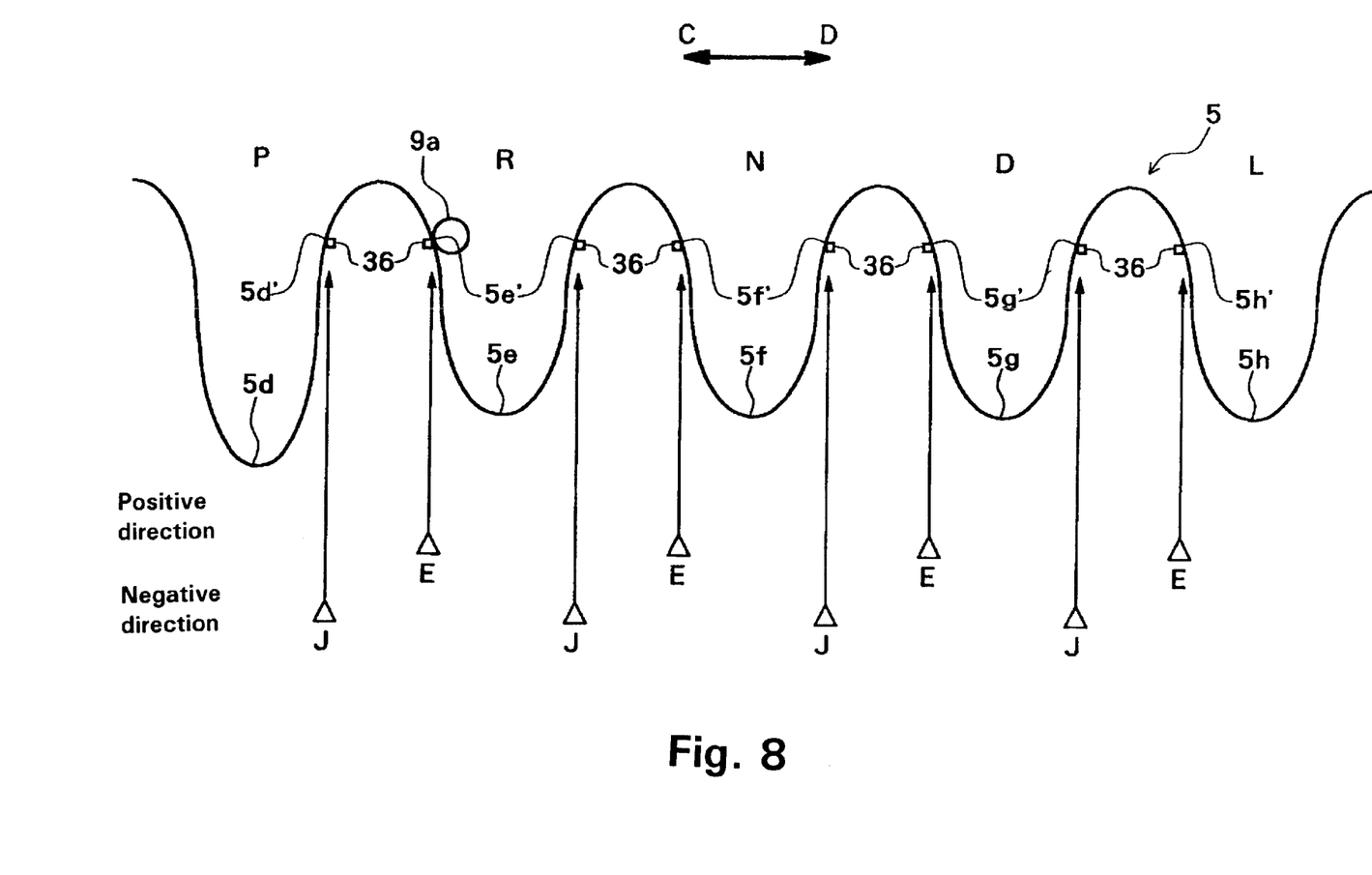
FIG. 8 is a view illustrating inlets conformed to a rotating direction of the detent lever.

In addition, while an explanation has been given of the operation in the case where the detent lever 5 in the range switchover apparatus 1 according to the embodiment rotates in the direction of the arrow D, it rotates in some cases in the direction of the arrow C. In FIG. 8, a position of the detent lever 5 relative to the roller 9a at the time of release of the clutch is in the vicinity of a point E (in the vicinity of inlets 5d', 5e', 5f', 5g', 5h') in the case where the detent lever 5 rotates in the direction of arrow D, and is in the vicinity of a point J (in the vicinity of inlets 5d', 5e', 5f', 5g', 5h') in the case where the detent lever rotates in the direction of the arrow C. In addition, the range engagement groove indicated by the character 5d is formed to have a valley of greater depth than that of the other range engagement grooves.

While the range switchover apparatus according to the embodiment has been explained taking the N-D shift as an example, it is applicable to the other shifts, such as P-R shift and D-L shift. Also, control may be performed not only between adjacent ranges, but also in P-D shift with a target time set.

Also, while the range switchover apparatus according to the embodiment has been explained taking the apparatus with the clutch 19 as an example, it is applicable to an apparatus which is not provided with a clutch and in which a drive motor and a manual valve are connected to each other at all times.

Further, because the detent lever 5 is biased by the roller 9a, which is elastically provided on the detent spring 9, it seems that in the case where the roller 9a abuts against an inclined surface of the range engagement groove, the detent lever 5 biases the roller 9a to rotate to enable the roller 9a to be borne on the valley of the range engagement groove. However, the detent lever minimally biases rotation by the roller 9a because there is provided the worm gear 12b for decelerating the rotation of the motor 12.

According to the invention, even when the drive motor changes in rotational speed to lead to delaying of the range switchover time due to long term change, it is possible to automatically control the rotational speed to a predetermined rotational speed so that a switchover time comes within a target time. Thus, the switchover means can be correctly switched over within the target time.

Further, according to the invention, a target time is set in accordance with environmental conditions, and so it is possible to surely switch over the switchover means within the target time in response not only to long term change but also to a change in the environment.

What is claimed is:

1. A range switchover apparatus for automatic transmissions, comprising:

a range switchover means operating unit capable of switching over a switchover means, which switches over a shift range among respective shift positions;

a drive motor for driving the range switchover means operating unit;

a measuring unit for measuring a time, during which the drive motor causes the range switchover means operating unit to switch over between predetermined shift positions;

a rotation control unit for controlling the rotational speed of the drive motor;

a correcting unit for correcting the rotational speed by the rotation control unit so that when a time measured by the measuring unit differs from a target time in a predetermined range, the measured time becomes the target time; and a storage unit for storing the rotational speed corrected by the correcting unit.

2. The range switchover apparatus for automatic transmissions according to claim 1, wherein the target time is set in accordance with an environmental conditions, the rotation control unit controls the rotational speed of the drive motor on the basis of a duty ratio of the drive motor, and the correcting unit compares the measured time and the target time with each other to correct the duty ratio so as to make the duty ratio larger when the measured time exceeds the target time and to correct the duty ratio so as to make the duty ratio smaller when the measured time is short of the target time.

3. The range switchover apparatus for automatic transmissions according to claim 1, wherein the rotation control unit adjusts a duty ratio of the drive motor in accordance with environmental conditions.

4. The range switchover apparatus according to claim 3, further comprising a sensing unit including a voltage meter and a temperature sensor for measuring the environmental conditions.

5. The range switchover apparatus according to claim 4, wherein the voltage meter measures a voltage of a battery for the drive motor and the temperature sensor measures a temperature of oil in the automatic transmission.

6. The range switchover apparatus according to claim 3, wherein the range switchover mechanism comprises:

a manual valve;

a detent lever, linked to the manual valve; and a range control shaft linking the drive motor and the detent lever.

7. The range switchover apparatus according to claim 3, wherein the control unit controls the drive motor on a basis of a shift lever position.

* * * * *